United States Patent
Hayes

(10) Patent No.: US 9,514,566 B2
(45) Date of Patent: Dec. 6, 2016

(54) IMAGE-GENERATED SYSTEM USING BETA DISTRIBUTION TO PROVIDE ACCURATE SHADOW MAPPING

(71) Applicant: Sunfish Studio, LLC, Minneapolis, MN (US)

(72) Inventor: Nathan T. Hayes, Minneapolis, MN (US)

(73) Assignee: SUNFISH STUDIO, LLC, Minneapolis, MN (US)

( * ) Notice: Subject to any disclaimer, the term of this patent is extended or adjusted under 35 U.S.C. 154(b) by 0 days.

(21) Appl. No.: 14/398,924

(22) PCT Filed: Mar. 15, 2013

(86) PCT No.: PCT/US2013/032624
§ 371 (c)(1),
(2) Date: Nov. 4, 2014

(87) PCT Pub. No.: WO2013/165621
PCT Pub. Date: Nov. 7, 2013

(65) Prior Publication Data
US 2015/0116324 A1 Apr. 30, 2015

Related U.S. Application Data

(60) Provisional application No. 61/642,593, filed on May 4, 2012.

(51) Int. Cl.
*G06T 15/60* (2006.01)
*G06T 15/50* (2011.01)

(52) U.S. Cl.
CPC .............. *G06T 15/60* (2013.01); *G06T 15/506* (2013.01)

(58) Field of Classification Search
CPC ........................... G06T 15/60; G06T 2215/12
See application file for complete search history.

(56) References Cited

U.S. PATENT DOCUMENTS

| | | | |
|---|---|---|---|
| 6,704,025 B1 | 3/2004 | Bastos et al. | |
| 6,760,024 B1 | 7/2004 | Lokovic et al. | |
| 8,633,948 B2 | 1/2014 | Hayes | |
| 2006/0290780 A1 | 12/2006 | Porikli | |
| 2008/0150943 A1 | 6/2008 | LeFrancois | |
| 2010/0020080 A1 | 1/2010 | Iwanaga | |
| 2010/0188416 A1 | 7/2010 | Hayes | |

OTHER PUBLICATIONS

Yang et al, (Variance Soft Shadow Map, Computer Graphics, Sep. 2010, vol. 29, Issue 7, p. 2127-2134).*
Fernando (Percentage-Closer Soft Shadows, Proceeding SIGGRAPH'05 ACM SIGGRAPH 2005, article No. 35).*

(Continued)

*Primary Examiner* — Zhengxi Liu
*Assistant Examiner* — Yanna Wu
(74) *Attorney, Agent, or Firm* — Dicke, Billig & Czaja, PLLC

(57) ABSTRACT

A computer-based system forms a more accurate intensity value for virtual light reflected from computer-generated images. The reflected light intensity from the images is computed pixel by pixel using the mean and variance of the depth values of a filter region associated with the pixel, as well as the maximum and minimum values of the depth values in the filter region. The computations use the normalized, incomplete beta function algorithm.

5 Claims, 7 Drawing Sheets

(56) References Cited

OTHER PUBLICATIONS

Fernando et al. (Adaptive Shadow Maps, ACM SIGGRAPH 2001, and Aug. 12-17, 2001, Los Angeles, CA, USA).*
Copenheaver, Blaine R., PCT International Search Report and Written Opinion of the International Searching Authority, PCT Application No. PCT/US13/32624, May 31, 2013.
Lindner, Nora, PCT International Preliminary Report on Patentability of the International Preliminary Examining Authority, PCT Application No. PCT/US13/32624, Nov. 13, 2014.
Donnelly, William and Lauritzen, Andrew, Variance Shadow Maps, 2006, 2006 Symposium on Interactive 3D Graphics and Games, ACM Press, pp. 161-165.
Reeves, William T.; Salesin, David H.; and Cook, Robert L., Rendering Antialiased Shadows with Depth Maps, 1987, Computer Graphics, vol. 21, pp, 283-291.
Annen, Thomas; Mertens, Tom; Seidel, Hans-Peter; Flerackers, Eddy and Kautz, Jan, Exponential Shadow Maps, 2008, Graphics Interface, pp. 151-161.
Lauritzen, Andrew, Summed-Area Variance Shadow Maps, 2007 GPU Gems 3, Chapter 8.
Lauritzen, Andrew and Mccool, Michael, Layered Variance Shadow Maps, 2008, Graphics Interface, pp. 139-146.
Annen, Thomas; Mertens, Tom; Bekaert, Philippe; Seidel, Hans-Peter; and Kautz, Jan, Convolution Shadow Maps, 2007, Eurographics Symposium on Rendering.
Press, William H.; Teukolsky, Saul A.; Vetterling, William T.; and Flannery, Brian P., Numerical Recipes, The Art of Scientific Computing, Third Edition, 2007, Chapter 6.4 the.
Williams, Lance, Pyramidal Parametrics, 1983, Computer Graphics vol. 17, No. 3, pp. 1-11.
Peachey, Darwyn, Texture on Demand, 1990, Pixar Animation Studios—Technical Memo #217.

* cited by examiner

VARIANCE SHADOW MAPS
(PRIOR ART)

$N = 3, n = 0..N$ $R = 2^N$ $L(w) = \max(0, \min(\text{floor}(\log2(1/w)), N))$ $\text{offset}(n) = (4/3)*(R^2 - 2^{(L(nx)+L(ny))}) = (4/3)*(R^2 - 2^{(2n)})$ "mipmap"

IMAGE-GENERATED SYSTEM USING BETA DISTRIBUTION TO PROVIDE ACCURATE SHADOW MAPPING

CROSS-REFERENCE TO RELATED APPLICATIONS

This is an international application filed under 35 U.S.C. §363 claiming priority, under 35 U.S.C. §119(e)(1), of provisional application Ser. No. 61/642,593, previously filed 4 May 2012, under 35 U.S.C. §111(b).

BACKGROUND OF THE INVENTION

The invention relates to creation of video sequences. Human artists now usually synthesize these video sequences. They laboriously create individual frames, each of which is slightly different from the preceding so as to simulate movement of the objects in the frames when the sequence is displayed.

After a series of frames are complete, the creator views them to assure realism. Quite often, defects exist, so the creator then edits the frames and continues this iterative process until a satisfactory final version exists.

To view a video sequence, the individual frames of a video sequence must go through a mathematical processing called rendering. Rendering converts the human-generated frames into images suitable for viewing. Rendering is very computation-intensive, requiring an enormous number of individual calculations. Recent improvements in the algorithms have allowed the use of parallel processing that greatly reduce the rendering time for a video sequence.

The rendering computations now commonly used do not always produce accurate images however. One particular area of inaccuracy involves the display of objects at different distances from the observer, and which are illuminated from one or more sources. Frequently, the rendering will provide images that do not provide life-like representations of such illuminations and partial obscuring of objects, with shadows and lighted areas not accurately depicted. Partially lit areas will appear too dark or too bright. Such inaccuracies are conventionally referred to as aliasing.

Shadow map calculations are widely used to generate shadows in computer-generated images. Unlike a color image comprised of a two-dimensional array of color values, a shadow map comprises a two-dimensional array of depth values. For this reason, shadow maps cannot be filtered in the same way as color images. This typically leads to inaccuracy in the way that objects at different distances from the observer and from the light sources appear to the observer, i.e., aliasing.

The initial approach to reduced aliasing in shadow maps was a method known as percentage-closer filtering as for example is taught in "Rendering Antialiased Shadows with Depth Maps", Reeves, W., D. Salesin, and R. Cook, Computer Graphics, vol. 21, 1987, p. 283-291. Practitioners know this method well. It is commonly used in modern rendering systems, including high-performance graphics accelerators.

Essentially, each pixel in a depth map represents a step function, and the step in the step function occurs at the depth value stored for the pixel in the depth map. The result of the step function is binary, i.e., lookups into the depth map produce, for each pixel, a result that is either 0 (completely in shadow) or 1 (completely illuminated). Percentage-closer filtering examines the lookup results of a region of pixels in the depth map and weights them according to a weighting function. The weighted results are then summed into a single value in the range [0,1] which represents a weighted estimate of the ratio of pixels in the examined region which are not in shadow.

One of the primary disadvantages of the percentage-closer filtering method is it often requires exceedingly high-resolution shadow maps and large filter regions in order to produce high-quality results. This is especially true when rendering scenes comprised of finely detailed objects, such as hair or fur. In this case, a very large region of pixels must be examined by the percentage-closer filtering method in order to return good anti-aliasing results. The use of such large filter regions can be computationally expensive. Even worse, the total number of pixels in the shadow map must be increased to accommodate the large filtering regions. This often requires the size of the shadow map to be increased exponentially, which likewise causes an exponential increase in storage requirements.

To remedy these problems, at least one system uses deep shadow maps as a further improvement to the percentage-closer filtering method. Instead of storing a single depth value for each pixel in a shadow map, a deep shadow map stores a visibility function at each pixel. Each visibility function is parameterized by its particular depth; therefore each pixel of a deep shadow map includes a representation of the visibility function over multiple depth values.

In U.S. Pat. No. 6,760,024, Lakovic, T. and E. Veach (2000), the representation of the visibility function is piecewise-linear, i.e., each pixel in the deep shadow map is comprised of a list of values representing a piecewise-linear approximation of the visibility function associated with the pixel. The number of elements in the list of each pixel may vary, and in some cases large quantities of elements may be present in a list. Therefore a compression algorithm may be used to reduce the size of the lists to thereby minimize memory accesses and storage space.

In this regard, lookups into a deep shadow map fail to produce for each pixel, a binary result, e.g., 0 or 1. Rather, lookups for each pixel return a fractional value in the range [0,1]. These fractional values can then be percentage-closer filtered as before. Because the lookup value for each pixel within the neighborhood is a fractional value in the range [0,1] rather than a binary value, the overall filtering which is obtained from a deep shadow map is superior to prior-art percentage-closer filtering methods.

From a technical perspective, it is somewhat inaccurate to suggest that a deep shadow map storing a visibility function for each pixel in the shadow map significantly advanced the technology. As a practical matter, the single depth value stored for each pixel in the map by earlier shadow map systems storing also represents a "visibility function," wherein each pixel represents a step function as previously described in the discussion of percentage-closer filtering. The novelty of the Lakovic and Veach deep shadow maps, therefore, is the method of storing a piecewise-linear approximation to a visibility function that is more sophisticated than a step function. Indeed, this is the real emphasis of the Lakovic and Veach patent.

One of the primary disadvantages of the deep shadow map method is the variable nature of its storage requirements. Because each pixel in the map comprises a piecewise-linear approximation to a visibility function, and because each piecewise-linear approximation may comprise a variable number of elements depending on the particular pixel, the memory storage requirements of a deep shadow map will vary. Furthermore, elements of each pixel are typically stored in a linked-list data structure which often causes list elements to be fragmented, i.e., stored in a non-contiguous arrangement within the memory image of the shadow map, requiring extra memory access events to store and retrieve individual pixel data.

For these reasons, deep shadow maps are by nature not "friendly" to real-time hardware circuits exemplified by modern Graphics Processing Units (GPUs). Most state-of-the-art GPUs are highly optimized Single Instruction Multiple Data (SIMD) hardware machines designed to efficiently process regular or repeating patterns of data arranged or residing in contiguous chunks of memory. The deep shadow map method, by contrast, does not conform well to the requirements of SIMD processing due to its variable nature, and it has therefore been relegated in practice only to non real-time software embodiments, e.g., computer graphics rendering applications such as the RenderMan® software system.

Variance shadow maps, a recent improvement to prior-art methods, overcome some of these obstacles in a very clever way. The publication "Variance Shadow Maps," Donnelly, W. and A. Lauritzen, Proceedings of the 2006 Symposium on Interactive 3D Graphics and Games, ACM Press, 2006, p. 161-165, introduced the original variance shadow map method. Unlike prior-art shadow maps (or deep shadow maps), a variance shadow map stores both the mean and variance values for each pixel.

The mean and variance values stored at each pixel within a variance shadow map parameterize a visibility function similar to that of a deep shadow map. The difference is that a variance shadow map, unlike a deep shadow map, does not store a piecewise-linear approximation to the visibility function. Instead, the variance shadow map stores an analytical approximation to the visibility function, which analytical approximation is parameterized (specified) by the two mean and variance values.

The mean and variance values stored for each pixel of a variance shadow map characterize the distribution of depth values within the area of the pixel. Typically, each mean and variance value is computed in a pre-processing step from a prior-art depth map, which is allocated and rendered with a higher resolution than the variance shadow map so as to provide a sub-pixel resolution. Sub-pixel resolution means that each pixel is subdivided into two or more pixels. The system generates a mean and variance pair for each sub-pixel. Thus, a number of mean and variance pairs define the appearance of each pixel.

The mean and variance of all sub-pixel areas within each pixel of a prior-art depth map can then easily be computed and stored in the associated pixel location within the variance shadow map. This data can then be translated into an improved definition of the pixel itself.

Various processes for filtering the variance shadow map data exist. Filtering of this variance shadow map data creates more realistic pictorial presentations. The details for such filtering are presented in the previously cited Donnelly and Lauritzen publication. To summarize, variance shadow maps can be pre-filtered using well-known methods such as mipmaps and summed area tables. This is not unlike the filtering that the Lakovic and Veach system performs in the deep shadow maps operations.

The major difference is that variance shadow maps conform well to the requirements of SIMD processing. This is due to the fact that each sub-pixel in a variance shadow map stores exactly the same number of mean and variance pairs. Therefore the memory requirements of the variance shadow map for each pixel are fixed, and the total memory requirements are a function of the resolution of the map. Additionally, the memory image of a variance shadow map forms a regular and repeating pattern of data easily arranged into contiguous chunks of memory. All of these properties suit SIMD processing requirements well, and for this reason SIMD processing computes variance shadow maps very efficiently. This is the major advantage of the variance shadow map system that Donnelly and Lauritzen taught. The success of the Donnelly and Lauritzen system in providing a real-time implementation using commercially-available GPUs underscores its value.

Variance shadow maps are not a panacea, however. In fact they have one significant defect. To describe this defect, Donnelly and Lauritzen used the term "light bleeding." in their article. The defect arises in the analytical approximation used by the variance shadow mapping approach. The analytical approximations that the mean and variance pairs associated with each pixel in the variance shadow map employ form the source of difficulty.

More specifically, the analytical approximation used by the method is a mathematical formula known as the one-tailed variant of "Chebychev's inequality," namely $$P(z) = \frac{\sigma^2}{\sigma^2 + \max(z - \mu, 0)^2} \quad (1)$$

In this formula, $\mu$ and $\sigma^2$ are the mean and variance, respectively, stored at a pixel within the variance shadow map, and the variable z represents increasing depth. When a lookup is performed, the mean and variance of a pixel within the variance shadow map are used to compute P for a given depth value z. The result of computing P will be a value in the range [0,1] representing the fractional amount of illumination for the pixel.

The problem with this analytical approximation is that for any given mean and variance, the value of P is overly conservative. This means that P will generally be "too bright," i.e., it will tend to falsely indicate that a pixel is more brightly illuminated than is true. Worse still equation (1) falsely indicates that a pixel is partially in shadow when in fact the pixel is completely shadowed. That is, light bleeds from neighboring pixels to distort the actual illumination for the pixel in question. This is a shortcoming of the Chebychev inequality, and it is the source of the unwanted light bleeding artifacts characteristic of the variance shadow map method.

FIGS. 1a and 1b show this in more detail. FIG. 1a is an example a distribution of 16 depth values defining the distance of areas in a filter region from a viewer. One can consider a filter region to correspond to a single pixel, although from a theoretical standpoint a filter region may comprise more or less than a single pixel. Larger depth values represent a greater distance of the filter region from the viewer.

The mean and variance of the 16 depth values in FIG. 1a are computed to specify a respective P value, which is depicted in FIG. 1b. The horizontal axis represents increasing distance from the viewer, e.g., increasing depth, and the vertical axis represents the fractional illumination of the entire filter region. If P(z) is 1, the region is totally illuminated; if P(z) is 0 the region is totally in shadow. Other values of P(z) in the range [0,1] indicate a fractional amount of illumination as seen by the viewer. One notes however that the actual minimum and maximum depth value within the region is, respectively, 2 and 8. Therefore all depth values smaller than 2 should be totally illuminated. Similarly, all depth values larger than 8 should be in total shadow. Intuitively speaking, a smooth transition from total illumination to total shadow in a manner which correlates to the distribution of depth values within the filter region would also be expected as an advantageous feature.

As can clearly be seen in FIG. 1, however, P does not posses any of these desirable properties. More specifically, the graph of P shows that all depth values within the filter region that are less-than or equal to 4 are completely illuminated when in fact they should be at least partially in shadow, i.e., they are "too bright." Similarly, the transition between the range of depth values within the region, i.e., the transition between the minimum depth value 2 and the maximum depth value 8, does not correlate to the distribution of depth values within the region. Even worse, the graph of P shows that depth values greater than 8 are at least partially illuminated when in fact any depth value greater than 8 should be in total shadow, i.e., "light bleeding" occurs because no light should penetrate beyond the largest depth value within the filter region, which in this case is 8. But as can clearly be seen, P does not represent this phenomenon accurately, and it is therefore the cause of artifacts in the prior-art methods.

Several ad-hoc approaches have been proposed to artificially "darken" the shadows produced by variance shadow maps in an effort to compensate for the light bleeding artifacts, e.g., "Summed-Area Variance Shadow Maps," Lauritzen, A., in chapter 8 of the book "GPU Gems 3," Addison Wesley Professional, 2007. Unfortunately, such an ad-hoc approach makes it difficult to produce acceptable results in all cases since the approach is not based on any plausible or physical mathematical relationship. Even in cases where it does work, such an ad-hoc approach often produces shadows that are "too dark" and therefore look unrealistic.

Other similar approaches include "Layered Variance Shadow Maps," Lauritzen, A., and M. McCool, 2008; "Convolution Shadow Maps," Annen, T. et. al., Eurographics Symposium on Rendering, 2007; and "Exponential Shadow Maps," Annen, T. et. al., Graphics Interface, 2008. All of these additional ad-hoc methods are similar variations on a theme, i.e., variance shadow maps, and, more specifically, they all attempt to address, unsuccessfully, the "light bleeding" issue previously described. As can clearly be seen by this body of work, there is a need for an improved variance shadow map method, namely a method for eliminating the "light bleeding" artifact which plagues the prior-art methods.

BRIEF DESCRIPTION OF THE INVENTION

A computer-based system forms a more accurate illumination or intensity value Q for virtual light reflected from computer-generated images. The reflected light intensity from the images is computed pixel by pixel using the mean and variance of the depth values of a filter region associated with a pixel, as well as the maximum and minimum values of the depth values in the filter region associated with that pixel. The computations preferably use the normalized, incomplete beta function algorithm to produce the intensity value Q.

DESCRIPTION OF THE PREFERRED EMBODIMENTS

The present invention provides an improved variance shadow mapping system that completely solves the light bleeding issue. The solution of the present invention is not ad-hoc and requires no "magic" parameters for users to tweak. Therefore the present invention provides all the advantages of prior-art variance shadow mapping methods with none of the disadvantages.

More specifically, the present invention is capable of producing high-quality anti-aliased shadows in a computer generated image which contain no "light bleeding" artifacts. Additionally, the present invention provides a more realistic and physically plausible transition in the regions between full illumination and total shadow than prior-art variance shadow mapping methods. For all these reasons, the present invention provides a method for creating computer-generated images of superior quality while maintaining full compatibility with SIMD processing requirements and other such advantageous features of the prior-art variance shadow mapping methods.

Figure 4:
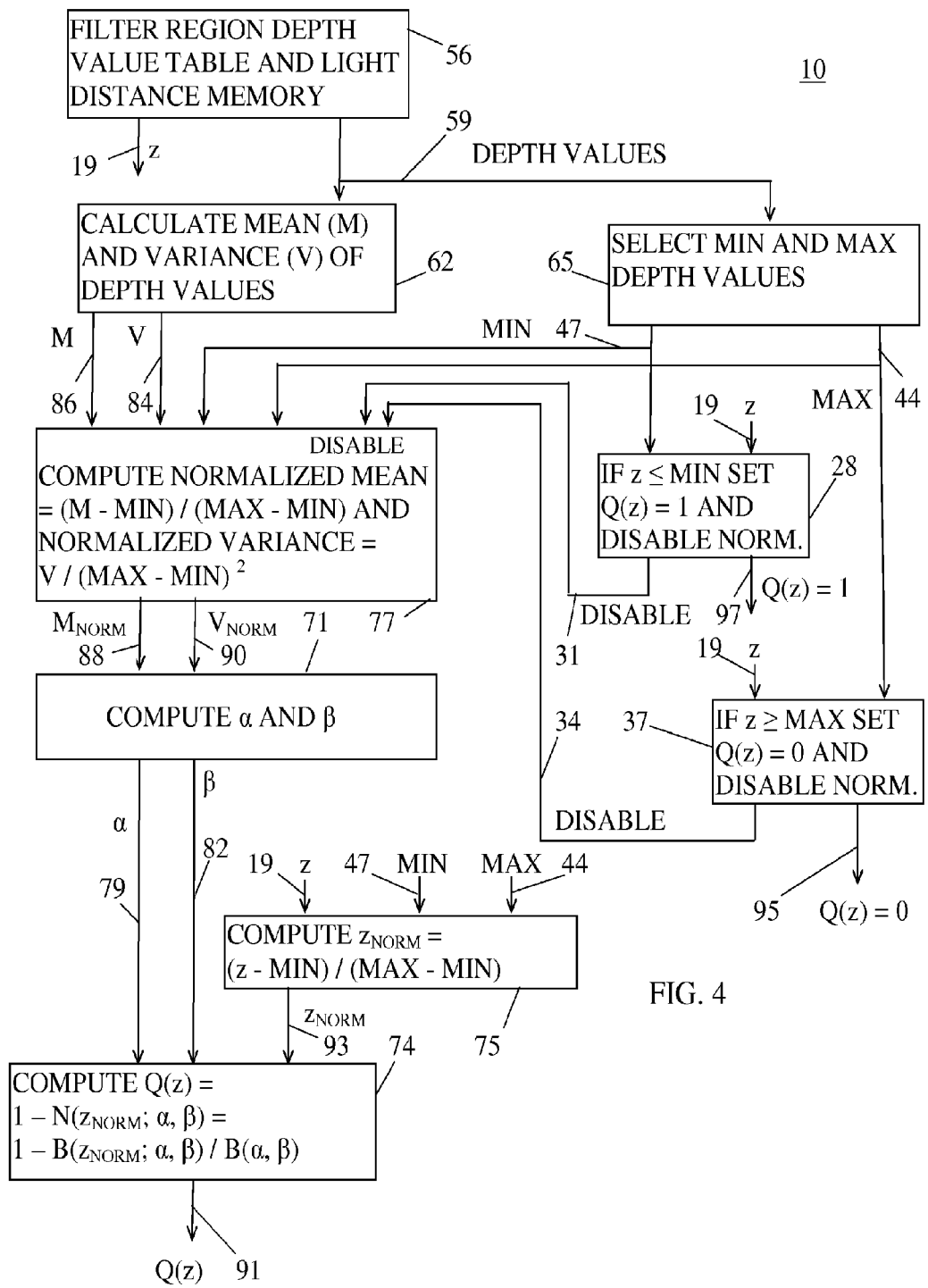
FIG. 4 is a block diagram of hardware elements that perform the computations necessary to more realistically represent the reflection of light from a virtual object in an image.

FIG. 4 is a block diagram of an electronic data processing system 10 when executing software incorporating the algorithms forming the basis for the invention. The system 10 of FIG. 4 typically comprises one or more computers and memory devices that execute these algorithms using data supplied to the computer from an outside source.

While system 10 as originally configured is commonplace, system 10 when executing the invention's software code, becomes during that time, special purpose hardware dedicated to perform the calculations that the algorithm specifies. In the example at hand, the software code that executes to allow a computer to implement the invention may be considered to have reconfigured the system into hardware elements whose components provide the numeric values useful in creating images having little or no aliasing or light bleeding characteristics.

That is, the components (logic gates and memory elements) comprising the computer, while the computer executes the software, actually change their physical structure. These altered components comprise electrical circuitry and send and receive electrical signals exactly as would a non-programmable circuit that executes the invention's algorithm. In the course of this instruction execution, the components undergo many physical changes as signals pass into and from them.

For example, at the elemental level, a logic gate within a CPU typically undergoes many physical changes while the computer executes the invention's software. Such physical changes typically comprise changes in the level of electrons within the gate. These changes alter the impedance between the various terminals of the gate, in this way allowing the computer to execute individual instructions of the software. Another way to think of this is to consider the software code as setting to their on or off state, literally millions of interconnected switches within the CPU. These switches then control changes in the state of other switches, so as to effect the computations and decisions typical of software code to execute the algorithm.

FIG. 4 comprises a number of functional blocks. Each of these functional blocks is a hardware element that performs the function specified for it. The arrows connecting them are data paths, with the arrows indicating the direction of data flow. In real life these arrows correspond to electrical paths within the computer that carry signals encoding the data. Typically, data carried on a particular path will be stored in a memory until another element requires that data as an input.

The mere fact that these hardware elements and the computer components comprising them are too small to be seen, or exist only for short periods of time while the relevant code executes is irrelevant as far as qualifying as patentable subject matter. Nothing in our patent law denies patent protection for inventions whose elements are too small to be seen or whose elements do not all exist simultaneously or for only short periods of time.

Accordingly, claims defining this invention must be treated in the same way that one treats an invention embodied in fixed circuit components on a circuit board. There is no reason to do otherwise.

Turning next to the specifics, the present invention is predicated on the observation that all "light bleeding" artifacts in the prior-art methods are due to analytical approximations of the visibility function which do not take into consideration the minimum and maximum depth values of a distribution of depth values within a filter region. Instead, the prior-art methods consider only the mean and variance of a distribution of depth values within a filter region, and this leads to the "too bright" and "light bleeding" errors previously discussed. Therefore it is not possible for any of the prior-art methods to guarantee the analytic approximation of the visibility function of a filter region within the shadow map will not be too conservative and therefore cause unwanted artifacts in a reconstruction of a computer-generated image. Only the deep shadow map method of the prior art is an exception to this rule, and the present invention advantageously combines this positive characteristic of deep shadow maps into an improved method of variance shadow mapping. The result is an improved method of variance shadow mapping which eliminates light bleeding artifacts and at the same time retains the unique advantages of traditional variance shadow maps over deep shadow maps.

Instead of providing an ad-hoc solution to the light bleeding problem, the present invention is predicated on a complete reformulation of the variance shadow mapping method. As has been previously shown in FIGS. 1a and 1b, the prior-art formulation of variance shadow maps is based on the function P, i.e., the one-tailed Chebychev inequality. A problem with P is that it is parameterized only by the mean and variance of a distribution of depth values within a filter region. This accounts for the problems previously discussed in relation to FIGS. 1a and 1b. Similarly, other related prior-art methods, such as the previously referenced publications, depend also on the pixel's mean and variance. The present invention abandons all of these prior formulations and instead chooses a beta distribution as the reference framework.

In FIG. 4, memory 56 holds a complete set of filter region depth values created for a particular image as well as one or more light distance values z corresponding to each filter region. Memory 56 encodes depth values similar to that shown in FIG. 1a for an individual filter region in depth value signals carried on path 59. Memory 56 encodes a light distance value associated with an individual filter region in a light distance value signal carried on path 19. Those familiar with computer operation understand that hardware elements performing computations can request individual data values as needed from memory 56.

The system 10 of FIG. 4 will compute the illumination or intensity value Q for each filter region as a function of the depth values and the light distance value associated with that filter region. System 10 will normally operate on each filter region whose data is held in memory 56, but considering the operation for a single filter region is sufficient to understand the entire operation of system 10.

A hardware element 62 receives from memory 56 a filter region depth value set in a filter region data signal carried on path 59 and computes the mean and variance for that filter region. The mean (M) and variance (V) values are encoded in mean and variance value signals carried on paths 86 and 84 respectively.

A hardware element 65 also receives from memory 56 the depth value data signal carried on path 59 and selects the minimum and maximum depth values for that filter region. The minimum (MIN) and maximum (MAX) depth values for that filter region are encoded in minimum and maximum signals carried on paths 47 and 44 respectively.

Hardware element 28 receives on path 19 and 47 respectively the light distance value z and the depth value minimum MIN associated with the filter region currently being processed. If z≤MIN is true, then element 28 sets the Q value=1 and puts a disable signal on a path 31.

Hardware element 37 receives on path 19 and 44 respectively the light distance value z and the depth value maximum MAX associated with the filter region currently being processed. If z≥MAX is true, then element 37 sets the Q value=0 and puts a disable signal on a path 31.

Hardware element 77 receives the mean and variance values in the signals on paths 86 and 84 respectively. Element 77 computes the normalized mean ($M_{NORM}$) of the depth values for the filter region as the difference between the mean and the minimum values divided by the difference between the maximum and minimum values. Element 77 encodes the normalized mean in a signal on data path 88.

Element 77 also computes the normalized variance ($V_{NORM}$) as equaling the variance V divided by the square of the difference between the maximum and minimum values carried in the signals on paths 44 and 47 respectively. Element 77 encodes the normalized variance in a normalized variance signal on data path 90.

Hardware element 75 receives the distance value, minimum depth value, and maximum depth value signals on paths 19, 47, and 44. Element 75 then computes a normalized depth value $z_{NORM}=(z-MIN)/(MAX-MIN)$. Element 75 encodes the numeric value of $z_{NORM}$ in a normalized distance value signal carried on path 93.

Hardware element 71 computes shape parameters for a function $N(z_{NORM}; \alpha, \beta)$. $\alpha=M_{NORM}([(M_{NORM}(1-V_{NORM})/V_{NORM}]-1)$ and $\beta=(1-M_{NORM})([(M_{NORM}(1-V_{NORM})/V_{NORM}]-1)$. Element 71 encodes the $\alpha$ and $\beta$ values in signals carried on paths 79 and 82 respectively. The following computations use normalized values to address the fact that typical distributions are over an interval other than [0, 1].

In probability theory and statistics, the beta distribution is a family of continuous probability distributions defined on the interval parameterized by these two positive shape parameters α and β. In particular, the present invention is concerned primarily with the cumulative distribution function of the beta distribution, also known as the normalized incomplete beta function, with the notation of $N(z_{NORM}; α, β)$.

Numerical methods for computing the normalized incomplete beta function are well known in the art, e.g., "Numerical Recipes $3^{rd}$ Edition: The Art of Scientific Computing," Press, W. et. al., Cambridge University Press, 2007 and ch. 6.4 therein (Numerical Recipes).

Hardware element 74 computes $N(z_{NORM}; α, β)$ using values encoded in the α and β signals and the normalized distance value $z_{NORM}$ received on paths 79, 82, and 93 respectively. It is most convenient to use the algorithm taught in Numerical Recipes to compute $N(z_{NORM}; α, β)$. $Q(z)=1-N(z_{NORM}; α, β)$. The notation $1-B(z_{NORM}; α, β)/B(α, β)$ noted in element 74 simply emphasizes the division of the incomplete β function by the complete β function to form $N(z_{NORM}; α, β)$. Element 74 then encodes Q(z) in a Q signal on path 91.

Figure 2:
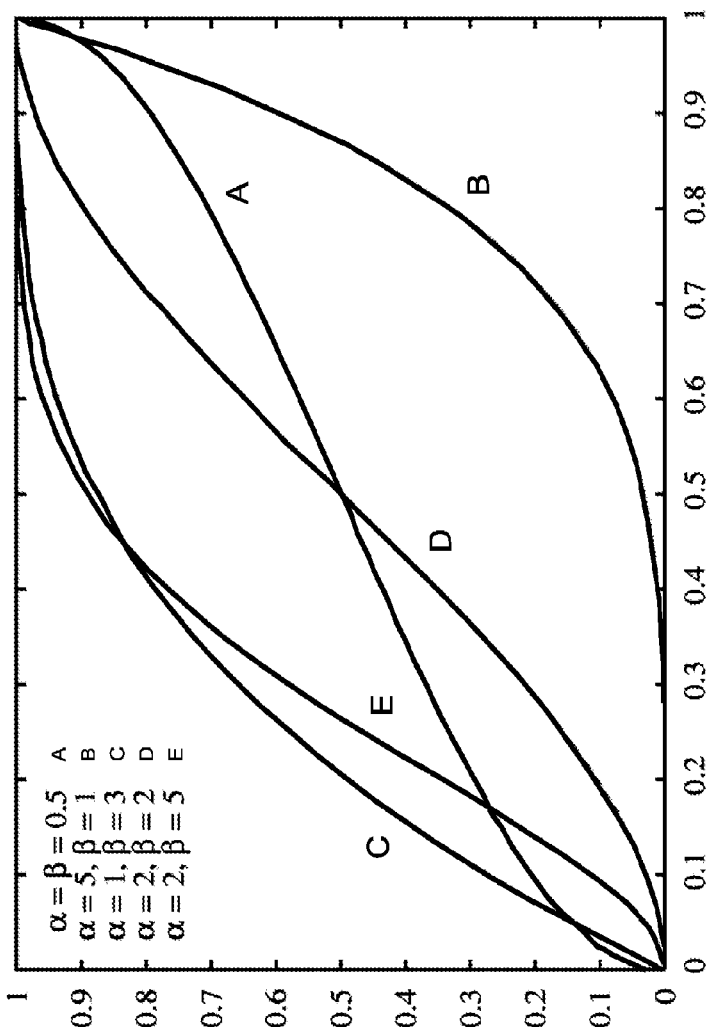
FIG. 2 shows various curves associated with intensity values.

FIG. 2 shows the normalized incomplete beta function for several values of α and β. As previously described, it is defined on the interval [0,1] and values within this domain are mapped to values in the range [0,1]. Because N is also a cumulative distribution function, it is always montonically increasing.

Figure 1B:
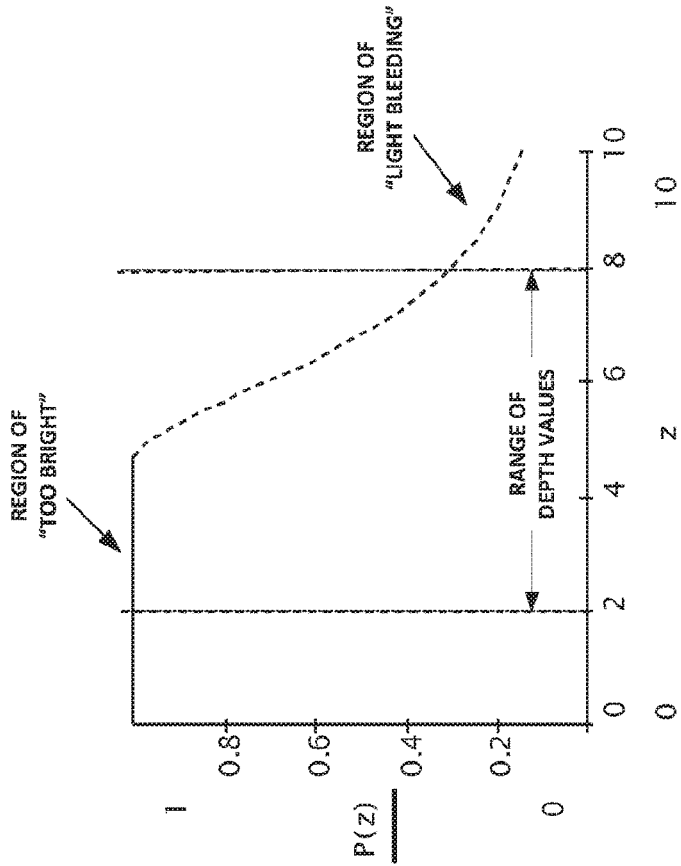
FIG. 1b illustrates one problem with current imaging systems.
Figure 1A:
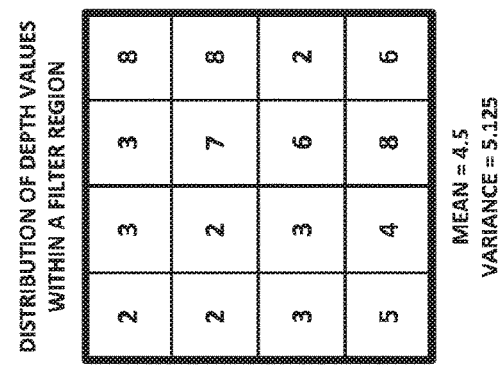
FIG. 1a is an exemplary set of depth values associated with a filter region.
Figure 3:
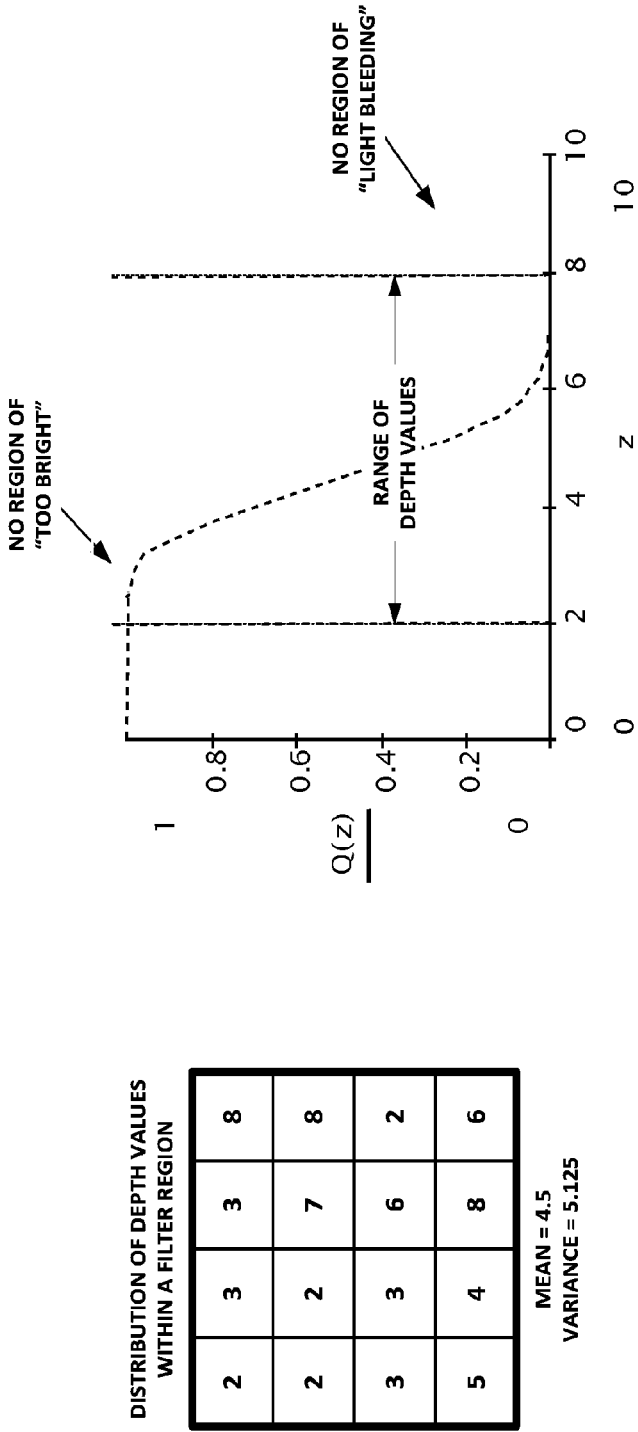
FIG. 3 illustrates the superior results that the invention to be described provides.

FIG. 3 shows the results of using the present invention on the same distribution of depth values previously depicted in FIG. 1a. In particular, the graph of Q is depicted in FIG. 3 on the right, and it can be compared to the graph of P as depicted in FIG. 1b. Notice that Q possesses all the desirable characteristics previously discussed, namely it does not have a region that is "too bright," it has a transition from total illumination to total shadow that correlates to the distribution of depth values within the filter region, and there is absolutely no region of "light bleeding," i.e., depth values greater than the maximum will always be in total shadow. All of these desirable characteristics of Q hold regardless of the number of depth values within the filter region.

Because the present invention uses the method of moments, all the advantageous filtering properties of prior-art variance shadow maps are retained. For example, improved variance shadow maps using the method of the present invention can easily be filtered using mipmaps or summed area tables. The only difference is that four pieces of information for each pixel must be stored and manipulated, namely minimum, maximum, mean, and variance. Embodiments of the present invention may choose to implicitly store the mean and variance in the shadow map as first and second moments, as suggested in the previously referenced publications by Lauritzen, or the mean and variance may be explicitly stored. Alternatively, an embodiment of the present invention may choose to explicitly store the pre-computed shape parameters α and β, along with the minimum and maximum, instead of the mean and variance (or the first and second moments). In all cases, only four pieces of information is required to be stored for each pixel in the shadow map.

When used in conjunction with the methods of transparency described in applicant's co-pending international patent application entitled "Single-Pass and Order-Independent Transparency in Computer Graphics Using Constant Memory," 2008, the present invention can advantageously provide high-quality transparent shadow maps. If colored shadows are desired, then minimum, maximum, mean, and variance are stored for each red, green and blue component of each pixel in the shadow map. This increases the size of the shadow map by a factor of three, but note the overall size of the shadow map is still a deterministic function of resolution and continues to satisfy SIMD processing requirements.

For all of these reasons, the present invention provides an improved method of variance shadow mapping that overcomes all the limitations of prior-art variance shadow mapping methods while at the same time retaining all the advantageous features and characteristics of same. Unlike deep shadow maps, the improved variance shadow maps of the present invention require less memory and/or storage space and are optimized for SIMD processing in real-time hardware environments, such as state of the art GPUs. While it is true that deep shadow maps still provide an arguably more accurate representation of the visibility function, in practice this accuracy comes at a heavier computational expense due to the variable storage requirements and other previously discussed drawbacks of the deep shadow map method. Therefore the improved variance shadow maps of the present invention represent an ideal implementation strategy for high-quality rendering of anti-aliased shadows in all but the most demanding of scenes. Even in these exceptional cases, as the resolution of an improved variance shadow map of the present invention is increased, the quality will quickly converge to that of a similarly large deep shadow map.

In furtherance of improving the computational efficiency and numerical stability of the disclosed method, a nonlinear weighting function is applied to the depth values before computing the beta distributions.

For example, before computing the minimum, maximum, mean and variance of a distribution of depth values in a filter region, a nonlinear weighting function is applied to all the depth values. The preferred embodiment of this nonlinear weighting function is $$w(z) = \frac{1}{z}$$

where z is a depth value representing the linear distance between a visible surface in the scene and the center of projection, and w(z) is the nonlinear weighting function. The weighting function w(z) causes linear distances that are very far away from the center of projection to contribute less weight to the overall shape of a calculated beta distribution.

Note that when using IEEE 754 arithmetic, if z is an infinite distance from the center of projection then w(z) will be zero. This is a highly advantageous feature in that the present invention can be applied to scenes which place the far clipping plane at infinity, as is typically the case in modern high-quality software rendering.

In addition to providing a complete solution to the "light bleeding" problem, the improved VSM method using beta distribution allows the shadow maps to be stored in pre-filtered data structures including, but not limited to, "mipmaps" as described by Lance Williams, "Pyramidal Parametrics," Computer Graphics 17.3, ACM, 1983, pp. 1-11, or "ripmaps" as described by Darwyn Peachey, "Texture on Demand," Technical Report, Pixar, 1990.

Figure 5:
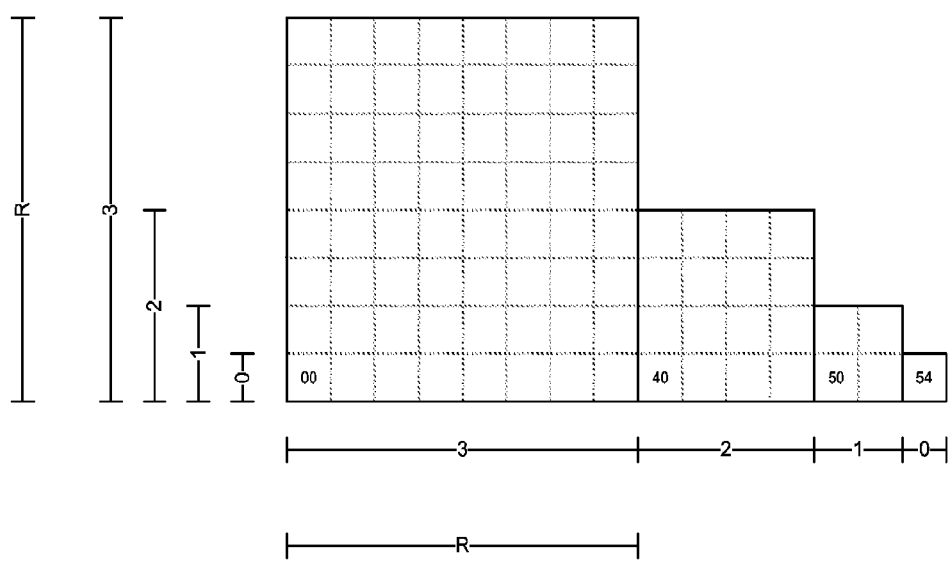
FIG. 5 shows the memory layout for a "mipmap" data set.

For example, FIG. 5 shows a "mipmap" linear addressing scheme. Given any filter width "w," the function L(w) computes a level n=0 . . . N with memory address given by the function offset(n). Pixels can then be selected from the resulting level. Similarly, FIG. 2 shows a "ripmap" linear addressing scheme, however in this case separate offsets are computed for the horizontal and vertical dimensions of the filter so that rectangular, e.g., non-square, filter regions can be accommodated.

Figure 6:
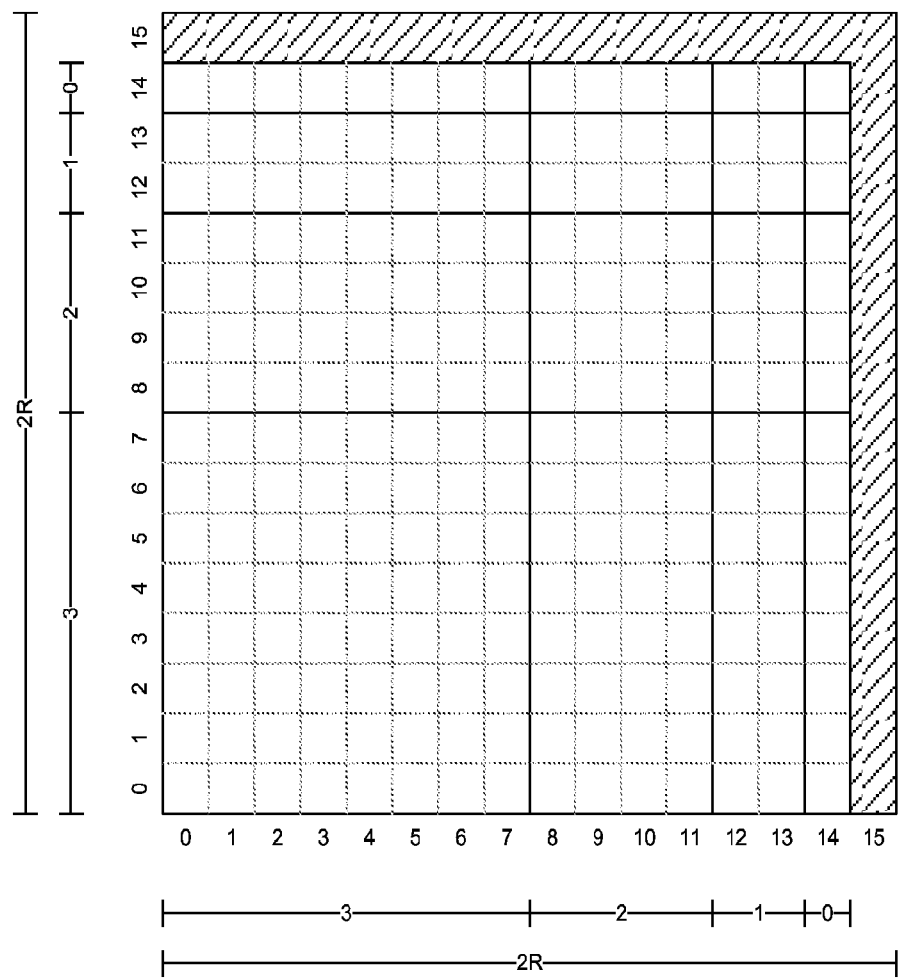
FIG. 6 shows the memory layout for a "ripmap" data set.
Figure 7:
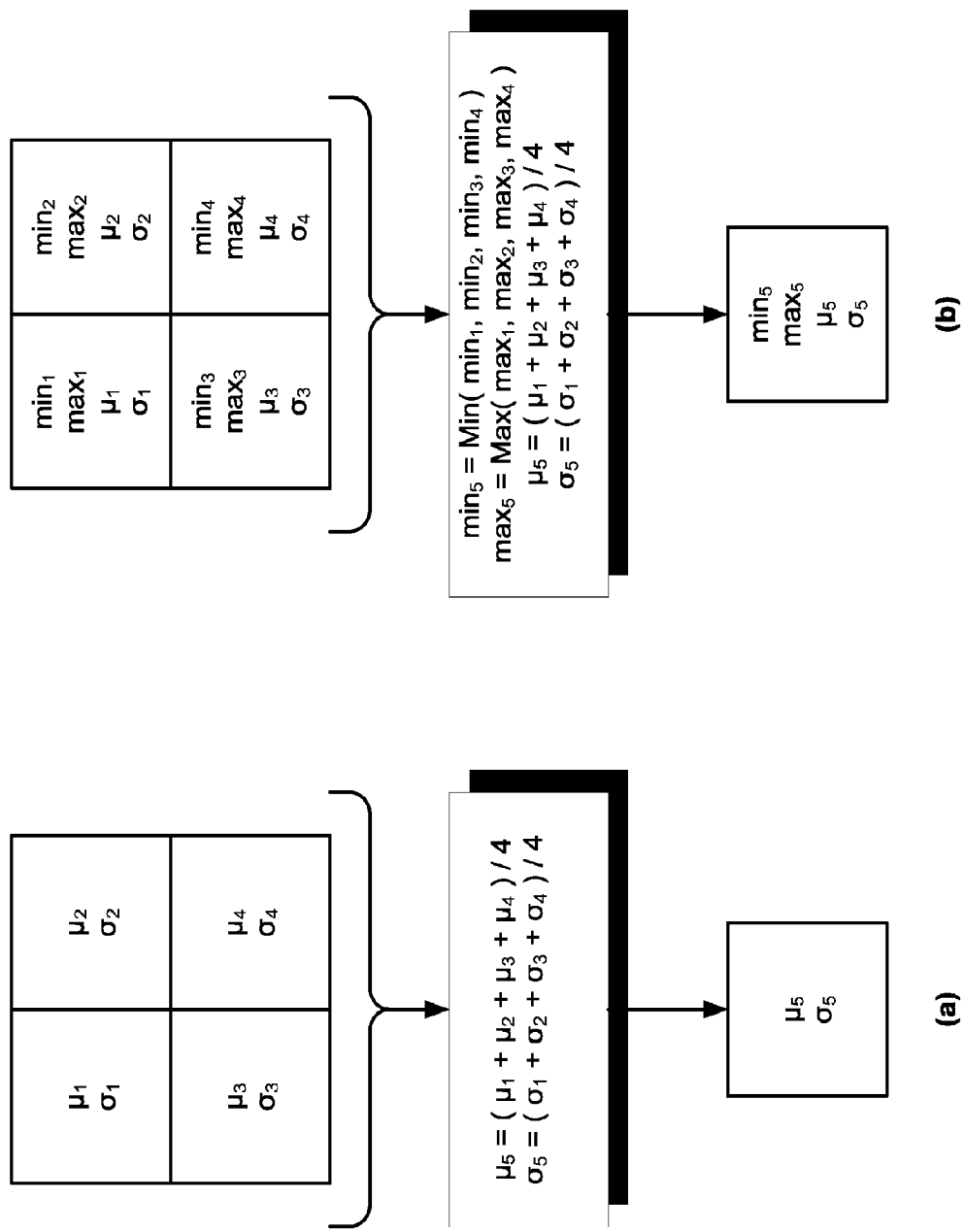
FIG. 7 shows a prior art computation at (a) and the improved computation at (b).

In the context of the improved VSM method, each pixel in FIG. 5 or FIG. 6 contains exactly four pieces of information: minimum, maximum, mean and variance. This is in contrast to the prior-art VSM method which stores only two pieces of information: mean and variance. FIG. 7(*a*) shows a prior-art VSM method. In this example, four pixels of a mipmap are pre-filtered into a single destination pixel of the next level in the mipmap. Namely, the average mean ($\mu$) and variance ($\sigma$) of the four pixels is stored in the destination pixel. By contrast, FIG. 7(*b*) shows, without limitation, an example of the improved VSM method using beta distribution. In this case, the average mean ($\mu$) and variance ($\sigma$) of the four pixels is stored in the destination pixel as well as the minimum of the minimums and the maximum of the maximums. The result is a destination pixel with a beta distribution that represents the mixture of all four pixels from the other mipmap level.

It should be noted that in these examples, the variance ($\sigma$) is typically stored in the shadow map as the second moment about the origin, not the second central moment, which is centered about the mean. This is to facilitate quick and easy pre-filtering using the formulas shown in FIG. 7. Other methods of storing the variance are described in the original disclosure by this author, and can be used as well. The mathematical equations to pre-filter the beta distributions should then be obvious.

The invention claimed is:

1. A variance shadow mapping system to produce anti-aliased shadows in an image) by computing an illumination value Q as a function of a light distance z for each filter region of the image includes
    a) a memory recording for each of a plurality of filter regions, a plurality of depth values of the image and a light distance value z and providing a depth value signal and a distance value signal encoding respectively the depth values of each filter region and the associated distance value;
    b) a first hardware element receiving the depth value signal, that computes for depth values in the filter region, the mean and variance for said depth values and provides said mean and variance values in first mean and variance signals;
    wherein the improvement comprises structure providing the illumination value Q, said structure comprising
    c) a third hardware element receiving the depth value signal and selecting therefrom the maximum and minimum depth values for the filter region, and providing the maximum and minimum depth values in maximum and minimum depth value signals respectively;
    d) a fourth hardware element receiving the first mean and variance signals and the maximum and minimum depth value signals, and computing therefrom normalized mean and normalized variance values, and providing the normalized mean and normalized variance values encoded in normalized mean and variance signals;
    e) a fifth hardware element receiving the normalized mean and variance signals and computing therefrom $\alpha$ and $\beta$ values as functions of the normalized mean and variance values, and providing the $\alpha$ and $\beta$ values encoded in $\alpha$ and $\beta$ signals;
    f) a sixth hardware element receiving the maximum and minimum depth value signals and the distance value signal and computing therefrom a normalized distance value, and encoding the normalized distance value in a normalized distance value signal;
    g) a seventh hardware element receiving the minimum depth value signal and the distance value signal encoding the light distance value z, and providing a Q signal encoding the value of 1 when z≤the minimum depth value;
    h) an eighth hardware element receiving the maximum depth value signal and the distance value signal encoding the light distance value z, and providing a Q signal encoding the value of 0 when z≥the maximum depth value; and
    i) a ninth hardware element receiving the normalized distance value signal and the $\alpha$ and $\beta$ signals, and computing therefrom the Q value as a function of normalized distance value and the $\alpha$ and $\beta$ values, and encoding this Q value in a Q value signal, wherein the Q value signal is used to render the image, wherein the Q value signal is used to compute pixel by pixel reflected light intensity from the image to produce the anti-aliased shadows.

2. The system of claim 1, wherein the ninth hardware element computes the Q value as 1 less a normalized incomplete beta function value dependent on the normalized distance value and the $\alpha$ and $\beta$ values.

3. The system of claim 1, wherein at least one of the seventh and eighth hardware elements provides a signal disabling operation of the fourth hardware element responsive to satisfying of the inequality in the at least one of the seventh and eighth hardware elements.

4. The system of claim 1, wherein the fourth hardware element computes the normalized mean as the difference between the mean and the minimum values divided by the difference between the maximum and minimum values.

5. The system of claim 1, wherein the fourth hardware element computes the normalized variance as equaling the variance divided by the square of the difference between the maximum and minimum values.

* * * * *